United States Patent
Song

(10) Patent No.: US 6,916,063 B2
(45) Date of Patent: Jul. 12, 2005

(54) REINFORCED STRUCTURE FOR REAR PART OF FRONT SIDE RAIL IN VEHICLE

(75) Inventor: Si-Cheoul Song, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/701,925

(22) Filed: Nov. 4, 2003

(65) Prior Publication Data

US 2004/0113463 A1 Jun. 17, 2004

(30) Foreign Application Priority Data

Dec. 12, 2002 (KR) ............................. 10-2002-0079046

(51) Int. Cl.⁷ ............................................... B62D 25/20
(52) U.S. Cl. ............................. 296/203.02; 296/187.09
(58) Field of Search ....................... 296/187.01, 187.03, 296/187.09, 193.09, 203.01, 204, 203.02

(56) References Cited

U.S. PATENT DOCUMENTS

| | | | |
|---|---|---|---|
| 3,614,124 A | 10/1971 | Schwabenlender | |
| 4,909,565 A | 3/1990 | Harasaki et al. | |
| 5,125,715 A | * 6/1992 | Kijima | 296/187.09 |
| 5,149,132 A | 9/1992 | Ruehl et al. | |
| 5,308,115 A | 5/1994 | Ruehl et al. | |
| 5,381,871 A | 1/1995 | Ohta | |
| 6,010,155 A | 1/2000 | Rinchart | |
| 6,361,102 B1 | * 3/2002 | Han | 296/203.02 |
| 6,547,318 B2 | * 4/2003 | Takeuchi | 296/204 |
| 6,592,175 B2 | * 7/2003 | Shibata | 296/203.02 |

FOREIGN PATENT DOCUMENTS

| | | |
|---|---|---|
| EP | 1 029 773 A2 | 8/2000 |
| EP | 1 188 643 A1 | 3/2002 |
| EP | 1 241 079 A2 | 9/2002 |

* cited by examiner

Primary Examiner—Patricia L. Engle
(74) Attorney, Agent, or Firm—Morgan Lewis & Bockius LLP

(57) ABSTRACT

A reinforced structure for a rear part of a front side rail of a vehicle is configured to have a uniform cross-sectional shape for the rear rail (for example, a rear upper rail and a rear lower rail), which reinforces the rear part of the front side rail. The structure also provides lower and upper reinforcing members for forming a plurality of closed sections, such that strength is greatly improved in relation to a frontal impact in a vehicle collision. The reinforced structure also prevents the rear rail from being excessively deformed in a vehicle collision.

6 Claims, 2 Drawing Sheets

REINFORCED STRUCTURE FOR REAR PART OF FRONT SIDE RAIL IN VEHICLE

CROSS-REFERENCE TO RELATED APPLICATIONS

This application claims priority of Korean Application No. 10-2002-0079046, filed on Dec. 12, 2002, the disclosure of which is incorporated fully herein by reference.

FIELD OF THE INVENTION

The present invention relates to a reinforced structure for a front side rail of a vehicle and, more particularly, to a strengthened rear part of a front side rail.

BACKGROUND OF THE INVENTION

In general, a front side rail is installed in a longitudinal direction at both sides of a vehicle in the engine room for supporting and providing an installation space for the engine and transmission.

Accordingly, a front side rail is designed to effectively support the engine and transmission in the case of a frontal vehicle collision. As a result, it is important that the rear part of the front side rail have sufficient strength for withstanding such impacts in a vehicle collision.

SUMMARY OF THE INVENTION

Embodiments of the present invention provide a reinforced structure for a rear part of a front side rail of a vehicle for withstanding frontal collisions. Upon frontal impact, the reinforced structure collapses, thereby minimizing injury to the driver's knees.

In accordance with a preferred embodiment of the present invention, the reinforced structure for a rear part of a front side rail comprises a front side rail whose rear part is slanted downward; a rear lower rail whose front side is inclined and overlaps with the oblique rear part of the front side rail, while the back side of the rear lower rail is horizontally formed, wherein the cross-sectional view of the rear lower rail is U-shaped; and a rear upper rail having a U-shaped cross-sectional view overlaps with the upper side of the rear lower rail.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE INVENTION

Hereinafter, the preferred embodiment of the present invention will be described in detail with reference to the accompanying drawings.

Figure 1:
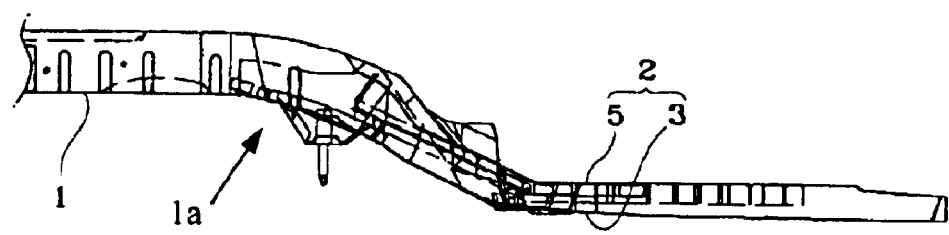
FIG. 1 is a side view illustrating a reinforced structure for a rear part of a front side rail according to an embodiment of the present invention.

FIG. 1 illustrates the rear part of a front side rail, in particular, an assembly of a rear lower rail and a rear upper rail mounted for reinforcing the rear part of the front side rail. The rear upper rail and the rear lower rail are respectively illustrated in FIGS. 2 and 3. FIG. 4 shows an assembled state of the rear upper rail and the rear lower rail.

Figure 3:
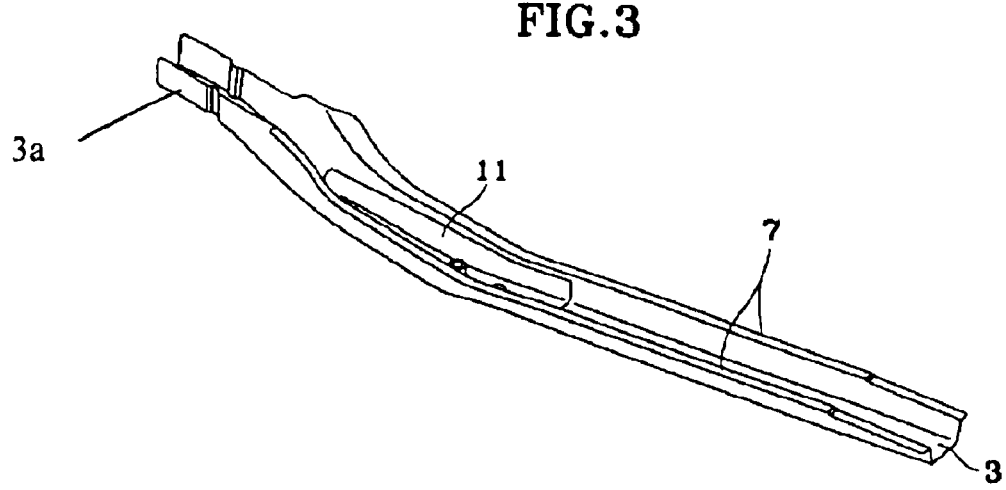
FIG. 3 is a perspective view of a rear lower rail mounted with a reinforced member according to the embodiment of the present invention.
Figure 4:
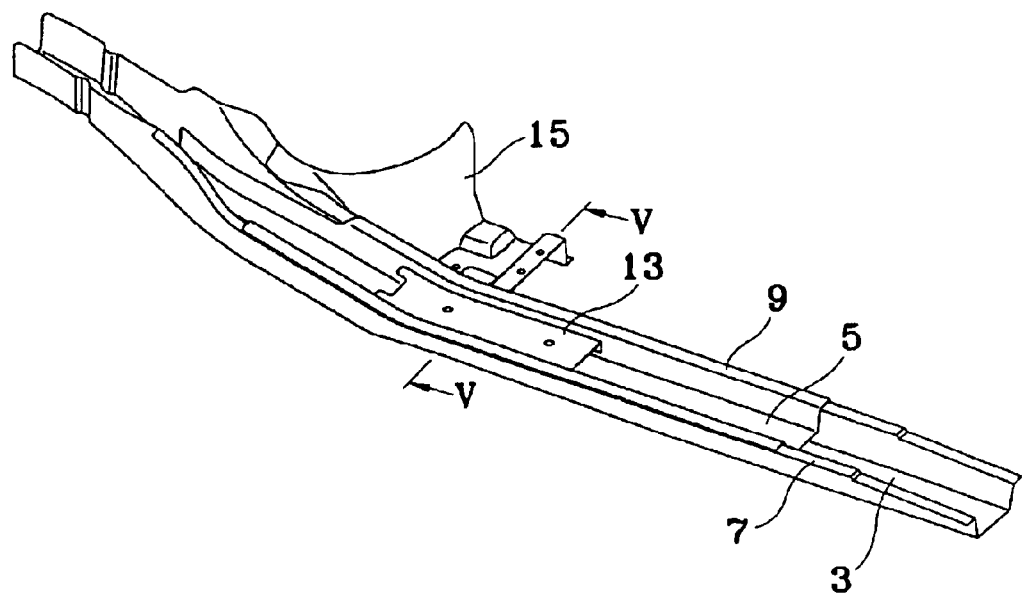
FIG. 4 is a perspective view illustrating an assembled state of the rear upper rail of FIG. 2 and the rear lower rail of FIG. 3 according to the embodiment of the present invention.

As shown in FIGS. 1 and 3, a front side rail 1 is formed with an installation space at the front for installing an engine and a transmission, and the back part 1a is downwardly slanted. The front part 3a of the rear lower rail 3 is angled to overlap with the oblique section of the rear part of the front side rail 1, and the back side thereof is horizontally formed. The cross-sectional view of the rear lower rail 3 is U-shaped from the front to the back side.

A rear upper rail 5 overlaps with the upper side of the rear lower rail 3 to form a U-shaped cross-sectional view from the front to back side. In other words, the oblique sections of the frontal portion of the rear upper rail 5, the frontal portion of the rear lower rail 3 and the rear part of the front side rail 1 all run parallel to each other. The back side of the rear upper rail 5 is horizontally formed.

A lower flange 7 widens outwardly at both upper edges of the rear lower rail 3. An upper flange 9 widens outwardly at both upper edges of the rear upper rail 5. The lower and upper flanges 7 and 9 are coupled to be overlapped (see FIG. 5).

Figure 5:
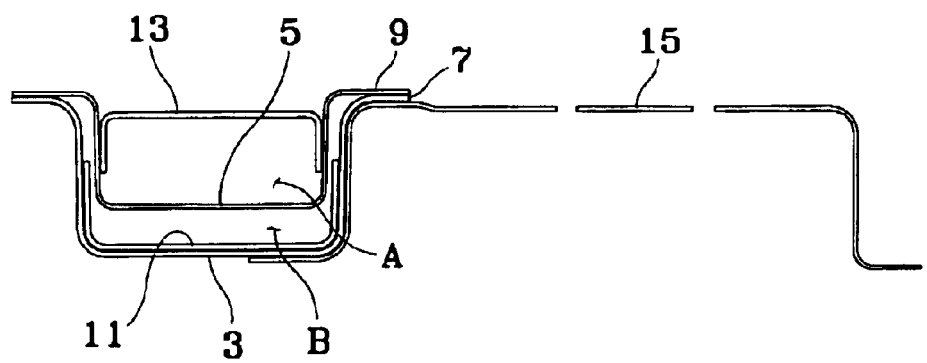
FIG. 5 is a cross-sectional view taken along line V—V of FIG. 4 according to the embodiment of the present invention.

As shown in FIGS. 3 and 5, a lower reinforcing member 11, having a U-shaped cross-section, is installed inside the rear lower rail 3 in the area between the oblique front part of the rear lower rail 3 and the horizontal rear part thereof. The cross-sectional height of the lower reinforcing member 11 is shorter than that of the inner cross-section of the rear lower rail 3, so that the upper side of the lower reinforcing member 11 does not protrude over the upper side of the rear lower rail 3.

Figure 2:
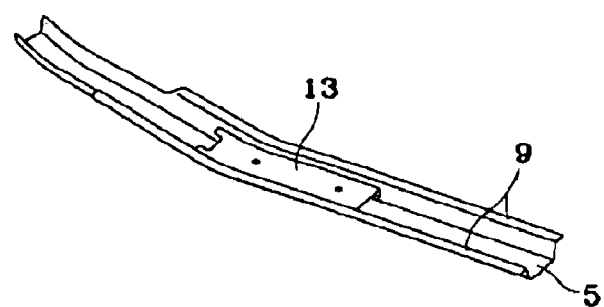
FIG. 2 is a perspective view of a rear upper rail mounted with a reinforced member according to the embodiment of the present invention.

With reference to FIGS. 2 and 5, an upper reinforcing member 13 having an n-shaped cross-section is mounted inside the rear upper rail 5 in the area between the oblique front part of the rear upper rail 5 and the horizontal rear part thereof for forming a closed section A with the rear upper rail 5. The height of the upper reinforcing member 13 is also shorter than that of the inner section of the rear upper rail 5, and thus, the upper side of the upper reinforcing member 13 does not protrude over the upper surface of the rear upper rail 5.

With reference to FIG. 5, the width of the cross-section of the rear upper rail 5 is smaller than that of the inner side of the rear reinforcing member 11, allowing the bottom side of the cross-section of the rear upper rail 5 to be inserted into the rear reinforcing member 11. The cross-sectional height of the rear upper rail 5 is designed to be shorter than that of the inner cross-section of the rear lower rail 3 for forming a closed section B with the rear lower rail 3.

As a result, as shown in FIG. 5, the depression part where the oblique rear part of the front side rail 1, the rear upper rail 5, and the horizontal rear part of the rear lower rail 3 are all conjoined is formed with a plurality of closed sections A and B that provide sufficient strength while the plurality of members all overlap one another. Accordingly, when the engine, transmission and other load move toward the rear of the vehicle upon frontal impact in the case of a vehicle collision, the reinforced structure mounted at the rear part of the front side rail 1 effectively supports the load for minimizing deformation of the rear rail 2, thereby greatly reducing injury to the passengers.

As shown in FIG. 4, a side panel connecting member 15 is coupled at a lateral surface of the rear lower rail 3 by welding or the like for connecting with a side panel (not illustrated). In other words, the rear lower rail 3 is not formed with a connecting portion for connecting to the side panel, but is coupled with an additional component such as the side panel connecting member 15. The cross-section from the front to rear side of the rear lower rail 3 uniformly maintains a U-shape, preventing deterioration of the strength of the rear lower rail 3 by preventing generation of stress concentration on the rear lower rail.

As apparent from the foregoing, a reinforced structure for a rear part of a front side rail in a vehicle is configured to have a uniform cross-sectional shape for a rear rail (e.g., a rear upper rail and a rear lower rail) to reinforce the rear part of the front side rail, and is provided with lower and upper reinforcing members for forming a plurality of closed sections, contributing to greatly improve the structure's strength upon impact to the front of the vehicle. Further, the reinforced structure minimizes any excessive deformation of the rear rail in a vehicle collision.

As a result, the pushing out of the dash panel mounted at the upper side of the rear rail and the brake pedal is minimized during a vehicle collision, resulting in a great reduction of impact to the driver's knees.

What is claimed is:

1. A reinforced structure for a rear part of a front side rail of a vehicle, the structure comprising:

a front side rail with a downwardly inclined rear part;

a rear lower rail with a front side inclined to overlap with the rear part of said front side rail and a horizontally formed back side, wherein said rear lower rail is U-shaped in cross-section;

a rear upper rail having a U-shaped cross-section overlapping with the upper side of said rear lower rail;

a lower flange formed at both upper edges of said rear lower rail;

an upper flange formed at both upper edges of said rear upper rail, wherein said lower flange and said upper flange are coupled to be overlapped;

a lower reinforcing member having a U-shaped cross-section, wherein said lower reinforcing member is installed inside said rear lower rail in an area between the front side of said rear lower rail and the horizontal formed back side thereof; and an upper reinforcing member having an n-shaped cross-section mounted inside said rear upper rail in an area between the front part of said rear upper rail and the horizontal formed back side thereof for forming a closed section with said rear upper rail.

2. The reinforced structure as defined in claim 1, wherein a width of the cross-section of said rear upper rail is smaller than that of the inner side of said lower reinforcing member, allowing a bottom side of said rear upper rail to be inserted into said lower reinforcing member.

3. The reinforced structure as defined in claim 2, wherein a cross-sectional height of said rear upper rail is shorter than that of an inner cross-section of said rear lower rail for forming a closed section with said rear lower rail.

4. The reinforced structure as defined in claim 1, wherein a side panel connecting member is coupled at a lateral surface of said rear lower rail for connecting with a side panel.

5. The reinforced structure as defined in claim 1, wherein the cross-section of said rear lower rail is uniformly configured in a U-shape from the front to back side.

6. The reinforced structure as defined in claim 1, wherein the cross-section of said rear upper rail is uniformly configured in a U-shape from a front to a back side.

* * * * *